United States Patent
Rune et al.

(10) Patent No.: US 9,788,360 B2
(45) Date of Patent: Oct. 10, 2017

(54) NODE AND METHOD FOR THE CONNECTIVITY MANAGEMENT OF A WIRELESS TERMINAL

(71) Applicant: Telefonaktiebolaget L M Ericsson (publ), Stockholm (SE)

(72) Inventors: Johan Rune, Lidingö (SE); György Miklós, Pilisborosjenö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 14/437,327

(22) PCT Filed: Feb. 13, 2013

(86) PCT No.: PCT/EP2013/052896
§ 371 (c)(1),
(2) Date: Apr. 21, 2015

(87) PCT Pub. No.: WO2014/067669
PCT Pub. Date: May 8, 2014

(65) Prior Publication Data
US 2015/0271868 A1    Sep. 24, 2015

Related U.S. Application Data

(60) Provisional application No. 61/719,613, filed on Oct. 29, 2012.

(51) Int. Cl.
*G01R 31/08*    (2006.01)
*H04W 76/04*   (2009.01)
(Continued)

(52) U.S. Cl.
CPC ......... *H04W 76/048* (2013.01); *H04W 4/005* (2013.01); *H04W 24/08* (2013.01); *H04W 24/10* (2013.01); *H04W 84/042* (2013.01)

(58) Field of Classification Search
CPC ...................................................... H04L 12/26
(Continued)

(56) References Cited

U.S. PATENT DOCUMENTS

| 2010/0331025 A1* | 12/2010 | Kallin | H04J 11/0069 455/500 |
| 2012/0020310 A1* | 1/2012 | Ji | H04W 48/16 370/329 |
| 2012/0295643 A1* | 11/2012 | Arvidsson | H04W 68/04 455/458 |

FOREIGN PATENT DOCUMENTS

| EP | 0 701 382 | 3/1996 | |
| EP | 0701382 A1 * | 3/1996 | ............ H04W 24/00 |

(Continued)

OTHER PUBLICATIONS

Notification of Transmittal of the International Search Report and the Written Opinion of the International Searching Authority, or the Declaration for International application No. PCT/EP2013/052896, dated Jun. 24, 2013.
(Continued)

*Primary Examiner* — Iqbal Zaidi
(74) *Attorney, Agent, or Firm* — Baker Botts, LLP

(57) ABSTRACT

Example embodiments presented herein are directed towards connectivity management of a wireless terminal (101) with the use of cell change statistics collected by the wireless terminal (101) over a predetermined period of time or as a result of a predetermined condition. The connectivity management involves a network node (401, 10, 111, 115) determining whether to place the wireless terminal (101) in a DRX or data over NAS connection mode or non-DRX connection mode. The connectivity management may also comprise determining a cycle length of a DRX connection mode.

21 Claims, 8 Drawing Sheets

(51) Int. Cl.
*H04W 24/08* (2009.01)
*H04W 4/00* (2009.01)
*H04W 24/10* (2009.01)
*H04W 84/04* (2009.01)

(58) Field of Classification Search
USPC .......................... 370/235–311; 455/436–500
See application file for complete search history.

(56) References Cited

FOREIGN PATENT DOCUMENTS

| EP | 1 944 985 | 7/2008 |
|---|---|---|
| WO | WO 2007/088381 | 8/2007 |
| WO | WO 2013 164025 | 11/2013 |

OTHER PUBLICATIONS

SA WG2 Meeting #86; Naantali, Finland; Title: Efficient small data transmission (S2-113826), Jul. 11-15, 2011.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); 3GPP Standard; 3GPP TS 36.300, 3rd Generation Partnership Project (3GPP) Mobile Competence Centre; XP050649950, Sep. 24, 2012.

\* cited by examiner

NODE AND METHOD FOR THE CONNECTIVITY MANAGEMENT OF A WIRELESS TERMINAL

PRIORITY

This nonprovisional application is a U.S. National Stage Filing under 35 U.S.C. §371 of International Patent Application Serial No. PCT/EP2013/052896, filed Feb. 13, 2013, and entitled "A Node and Method For The Connectivity Management Of A Wireless Terminal" which claims priority to U.S. Provisional Patent Application No. 61/719,613 filed Oct. 29, 2012, both of which are hereby incorporated by reference in their entirety.

TECHNICAL FIELD

Example embodiments presented herein are directed towards a wireless terminal and a network node, as well as corresponding methods therein, for managing a connected state (e.g., a DRX, a non-DRX, or a data over NAS connection mode) of the wireless terminal. The managing is based on cell change statistics collected by the wireless terminal over a period of time.

BACKGROUND

In a typical cellular system, also referred to as a wireless communications network, wireless terminals, also known as mobile station and/or user equipment units communicate via a Radio Access Network (RAN) to one or more core networks. The wireless terminals can be mobile stations or user equipment units such as mobile telephones also known as "cellular" telephones or "smartphones", and laptops with wireless capability, e.g., mobile termination, and thus may be, for example, portable, pocket, hand-held, computer-comprised, or car-mounted mobile devices which communicate voice and/or data with radio access network.

The radio access network covers a geographical area which is divided into cell areas, with each cell area, or cell, being served by a base station, e.g., a Radio Base Station (RBS), which in some networks is also called "NodeB" or "B node" and in other networks may be called Evolved NodeB (eNB) or Evolved Universal Terrestrial Radio Access Network (E-UTRAN) NodeB (eNB) and which in this document also is referred to as a base station. A base station may serve one or multiple cells, wherein a cell may also be referred to as a sector. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines and/or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. Universal Terrestrial Radio Access Network (UTRAN) is essentially a radio access network using wideband code division multiple access for user equipment units (UEs). The 3rd Generation Partnership Project (3GPP) has undertaken to evolve further the UTRAN and GSM based radio access network technologies. Long Term Evolution (LTE) together with Evolved Packet Core (EPC) is the newest addition to the 3GPP family.

In a currently popular vision of the future development of the communication in cellular networks huge numbers of (mostly) small autonomous devices become increasingly important. These devices are assumed not to be associated with humans, but are rather sensors or actuators of different kinds, which communicate with application servers (which configure the devices and receive data from them) within or outside the cellular network. Hence, this type of communication is often referred to as machine-to-machine (M2M) communication and the devices may be denoted machine devices (MDs). In the 3GPP standardization the corresponding alternative terms are machine type communication (MTC) and machine type communication devices (MTC devices) (with the latter being a subset of the more general term user equipment, UE, or wireless terminal). In terms of numbers MTC devices will dominate over human users, but since many of them will communicate very scarcely, their part of the traffic volume will be much smaller than their part of the "user" population.

With the nature of MTC devices and their assumed typical uses follow that they will often have to be very energy efficient, since external power supplies will often not be available and since it is neither practically nor economically feasible to frequently replace or recharge their batteries. In some scenarios the MTC devices may not even be battery powered, but may instead rely on energy harvesting, for example, gathering energy from the environment, opportunistically utilizing (the often very limited) energy that may be tapped from sun light, temperature gradients, vibrations, etc. For such energy deprived devices the traffic is characterized by small infrequent transactions (often delay tolerant), which will result in a large signaling overhead. Hence, reducing the signaling overhead is an important means to facilitate for such devices to efficiently function, with a long battery lifetime, using a cellular network.

A mechanism that has been introduced in cellular networks in order to save energy in the wireless terminal is discontinuous reception (DRX), which allows a wireless terminal to remain in an energy-saving sleep state most of the time, while waking up to listen for pages (in idle mode DRX) or downlink resource assignments (i.e., downlink transmissions) (in connected mode DRX). Furthermore, in order to make the DRX mechanism even more effective for energy deprived MTC devices, the maximum DRX cycle length (and thus sleep period) will be extended, for example, denoted "long idle mode DRX" and "long connected mode DRX" or "extended idle mode DRX" and "extended connected mode DRX". A DRX cycle thus comprises a sleep period followed by an active period and this cycle is repeated over and over.

Typically, but not necessarily, the sleep period is longer than the active period. A DRX cycle may have a more complex structure than described above, but for the aim of the example embodiments described herein, the simplified DRX cycle description suffices. Benefits of the long connected mode DRX concept include both reduction of control plane overhead (by reducing the number of idle to connected mode transitions) and reduction of energy consumption in the wireless terminal.

SUMMARY

A need exists to choose the most appropriate connection mode for a wireless terminal in order to maximize network resources while avoiding using suboptimal mechanisms. Thus, example embodiments presented herein may be utilized to detect and correct inappropriate connection mode choices and thus override the configuration based connection mode selection mechanism when needed. Such a mechanism may also be used for establishing a suitable connection mode default choice or tuning the connected mode DRX cycle length for a certain wireless terminal.

Some of the example embodiments utilize a collection of per wireless terminal cell change statistics, which is used to derive a measure of the cell change frequency, which in turn is used to determine the most appropriate connection mode (and/or connected mode DRX cycle length) for the wireless terminal. The cell change statistics may be collected by the wireless terminal and reported to the network, where it is accumulated, stored and processed.

At least one example advantage of some of the example embodiments presented herein is reducing the amount of signaling overhead utilized by the wireless terminal in reporting cell change statistics. Specifically, current systems configure wireless terminals to report such statistics as soon as a measurement is obtained. Some of the example embodiments presented herein provide for a wireless terminal collecting such statistics over a predetermined period of time.

Accordingly, some of the example embodiments are directed towards a method, in a wireless terminal, for facilitating connectivity management. The wireless terminal is comprised in a communications network. The method comprises collecting cell change statistics. The method also comprises sending, to a network node, data related to the cell change statistics for connectivity management of the wireless terminal.

Some of the example embodiments are directed towards a wireless terminal for facilitating connectivity management. The wireless terminal is comprised in a communications network. The wireless terminal comprises processing circuitry configured to collect cell change statistics. The wireless terminal also comprises radio circuitry configured to send, to a network node, data related to the cell change statistics for connectivity management of the wireless terminal.

Some of the example embodiments are directed towards a method, in a network node, for connectivity management of a wireless terminal based on, at least in part, data related to cell change statistics. The method comprises receiving data related to cell change statistics collected by a wireless terminal over a predetermined period of time. The method further comprises managing a connection state of the wireless terminal based, at least in part, on the data related to cell change statistics.

Some of the example embodiments are directed towards a network node for connectivity management of a wireless terminal based on, at least in part, data related to cell change statistics. The network node comprises radio circuitry configured to receive data related to cell change statistics collected by a wireless terminal over a predetermined period of time. The network node further comprises processing circuitry configured to manage a connection state of the wireless terminal based on, at least in part, the data related to cell change statistics.

Some of the example embodiments are directed towards a computer program product, comprising a computer usable medium having a computer readable program code embodied therein. The computer readable program code is adapted to be executed to implement a method, in a wireless terminal, for facilitating connectivity management. The method comprises collecting cell change statistics and sending, to a network node, data related to the cell change statistics for connectivity management of the wireless terminal.

Some of the example embodiments are directed towards a computer program product, comprising a computer usable medium having a computer readable program code embodied therein. The computer readable program code is adapted to be executed to implement a method, in a network node, for facilitating connectivity management. The method comprises receiving data related to cell change statistics collected by a wireless terminal over a predetermined period of time and managing a connection state of the wireless terminal based, at least in part, on the data related to cell change statistics.

DEFINITIONS

3GPP 3rd Generation Partnership Project
CDMA Code Division Multiple Access
DL Downlink
DRX Discontinuous Reception
EDGE Enhanced Data rates for GSM Evolution
EIR Equipment Identity Register
eNB eNodeB
eNodeB E-UTRAN NodeB or Evolved nodeB
EPS Evolved Packet System
E-UTRAN Evolved UTRAN
GERAN GSM EDGE Radio Access Network
GGSN Gateway GPRS Support Node
GPRS General Packet Radio Service
GSM Global System for Mobile communication
HLR Home Location Register
HO Handover
HSPA High Speed Packet Access
HSS Home Subscriber Server
ID Identity/Identifier
IE Information Element
IMEI International Mobile Equipment Identity
IMSI International Mobile Subscriber Identity
IP Internet Protocol
LTE Long Term Evolution
M2M Machine-to-Machine
MAC Medium Access Control
MD Machine Device
ME Mobile Equipment
MME Mobility Management Entity
MTC Machine Type Communication
NAS Non Access Stratum
O&M Operation and Maintenance
PGW Packet Data Network Gateway
PLMN Public Land Mobile Network
RLF Radio Link Failure
RRC Radio Resource Control
S1 The interface between the radio access network and the core network in EPS.
S1AP S1 Application Protocol (a protocol used between an eNB and an MME)
SPR Subscriber Profile Repository UE User Equipment
UICC Universal Integrated Circuit Card
UL Uplink
UMB Ultra Mobile Broadband
UMTS Universal Mobile Telecommunications System
USIM Universal Subscriber Identity Module
UTRAN Universal Terrestrial Radio Access Network
WCDMA Wideband Code Division Multiple Access
WiFi Wireless Fidelity
WiMAX Worldwide Interoperability for Microwave Access
X2 The interface between two eNBs in EPS.
X2AP X2 Application Protocol (a protocol used between two eNBs in EPS)

BRIEF DESCRIPTION OF THE DRAWINGS

The foregoing will be described in more detail with the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
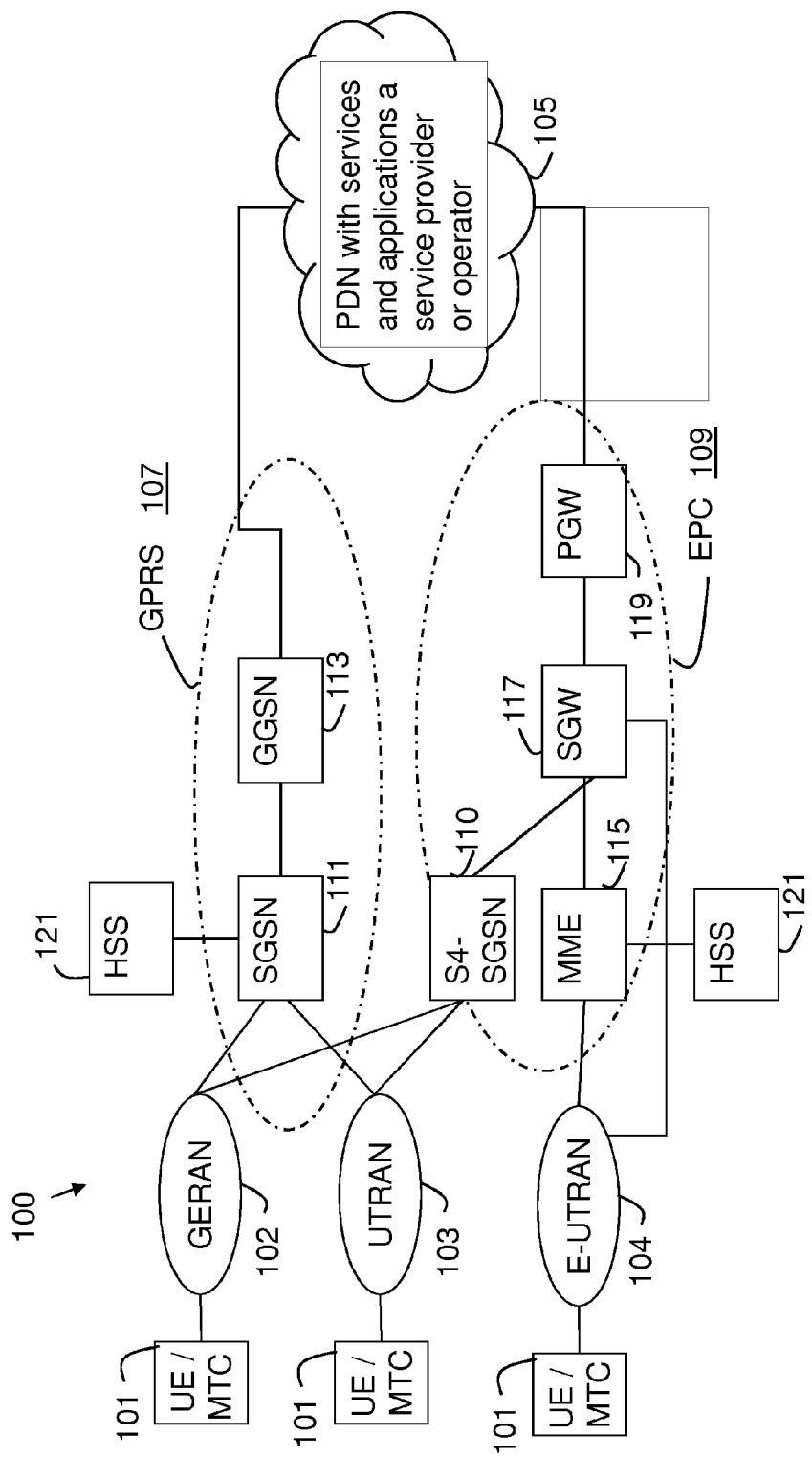
FIG. 1 is an illustrative example of a wireless network.

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments. It should be appreciated herein that the terms wireless terminal, UE, user equipment, MTC or M2M device may be used interchangeably. It should further be appreciated that while the example embodiments are described primarily with the use of MTC devices in mind, the example embodiments may be applied to any wireless terminal in general.
General Overview In order to better explain the example embodiments presented herein, a problem will first be identified and discussed. FIG. 1 provides an example of a communication network 100. As shown in FIG. 1, a wireless terminal or user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to the operator or application server 105, the UTRAN/E-UTRAN/GERAN subsystem 102-104 may be in communication with a core network, for example, a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and external networks and nodes, such as the Internet, the operator service network or application servers 105.

The EPC subsystem 109 may comprise a Mobility Management Entity 115, which may be responsible for idle mode UE tracking, paging procedures, and attachment and activation processes. The EPC subsystem may also comprise a Serving Gateway (SGW) 117, which may be responsible for the routing and forwarding for data packets. The EPC subsystem may also include a Packet data network Gateway (PGW) 119, which may be responsible for providing connectivity from the wireless terminal or user equipment 101 to external networks and nodes, such as the Internet, the operator service network or application servers 105. Both the SGSN 111 and the MME 115 may be in communication with a Home Subscriber Server (HSS) 121, which may provide device identification information, an International Mobile Subscriber Identity (IMSI), etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

During operation, the wireless terminal 101 may transition into various modes of operation for example a DRX connected mode (also called connected mode DRX), a non-DRX connected mode or a data over NAS connection mode. It should be appreciated that a non-DRX and DRX connection mode comprise communications without data over NAS. Thus, a data over NAS connection mode is distinct from a DRX and non-DRX connection mode. In the context of this disclosure a DRX connection mode and a non-DRX connection mode refer to the same regular type of connection mode differing in the aspect of whether DRX is used (i.e. configured for the user equipment or wireless device) or not. A regular type of connection mode comprises a connection typically used for communication in the current 3GPP family of cellular network systems. That is, a connection comprising user plane bearers established prior to the transfer of user data. In, for example, EPS and the packet switched domain of UMTS the connection, i.e., the user plane bearer(s), is established between the wireless terminal and the PGW (in EPS) or between the wireless terminal and the GGSN (in UMTS). "User data" refers to data conveyed on the user plane, i.e., data that pertains to the user or an application in the wireless terminal and which is distinct from the control data signalled between the wireless terminal and the cellular network. Such a bearer based connection mode thus may or may not use DRX. If it does use DRX, it falls under the term "DRX connection mode". If it does not use DRX, it falls under the term "non-DRX connection mode".

DRX is a periodic switching off of a receiver, usually to save energy. In a DRX connected mode the eNB signals to the wireless terminal that it should wake-up only at predetermined time intervals to check if there is any downlink data for the wireless terminal. Otherwise, the wireless terminal may go to sleep mode and save battery. Uplink transmissions are possible irrespective of the DRX configuration. DRX cycles may be configured in the LTE downlink so that the wireless terminal does not have to decode the PDCCH or receive PDSCH transmissions in certain subframes. It should be appreciated that the details of a connected DRX mode are further provided in 3GPP TS 36.300 section 12.

Figure 2:
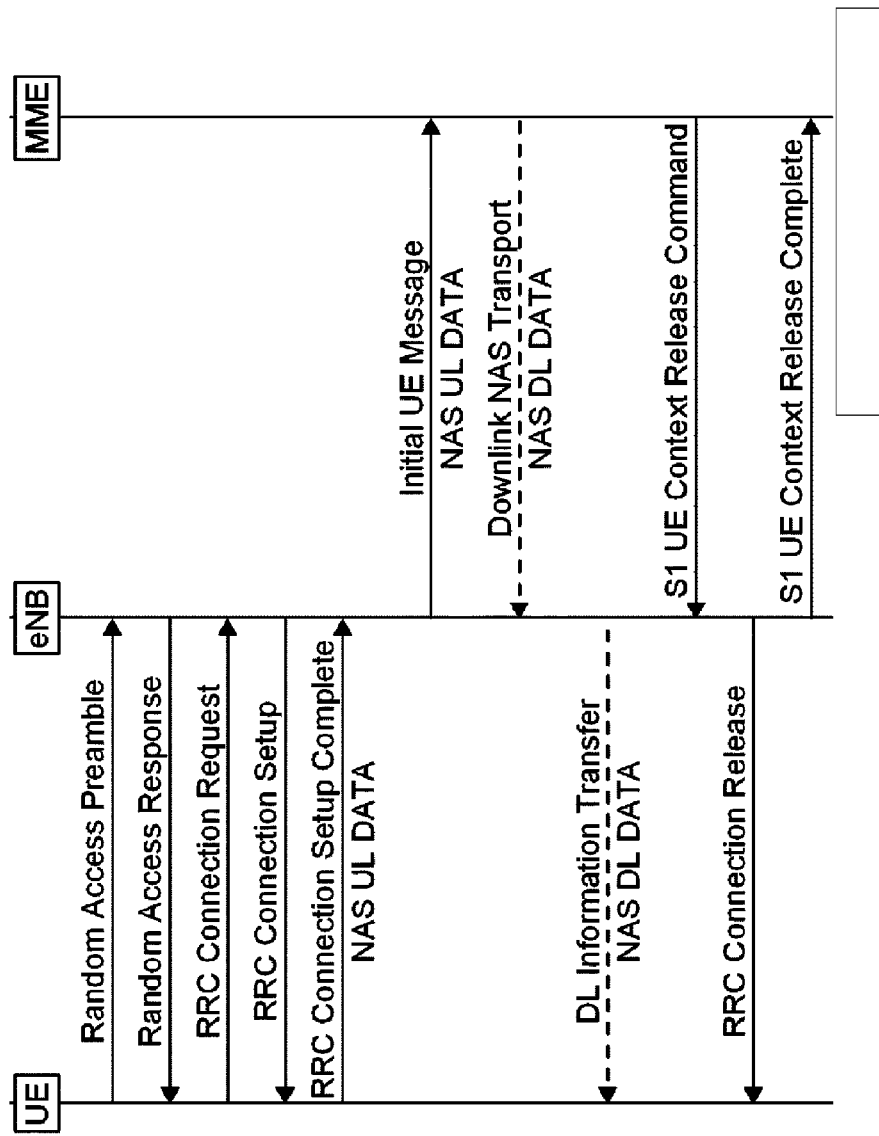
FIG. 2 is a messaging diagram depicting data over NAS uplink transmission in LTE.

FIG. 2 provides an example of connectivity management of a wireless terminal (or user equipment) by means of an LTE Uplink transmission. In the example provided in FIG. 2, NAS protocol is used to transfer data to and from the wireless terminal, such a procedure is termed "use of preestablished NAS security context to transfer the IP packet as NAS signaling without establishing RRC security".

The basic random access and RRC connection setup procedures are used as today. The RRC Connection Setup Complete RRC message comprises a NAS message, labeled "NAS UL DATA" in FIG. 2, which carries the data packet. This is further carried to the MME in an Initial UE Message S1AP message over S1. If there is some downlink data following shortly, it can be sent over NAS in a message as shown in FIG. 2 (where the downlink message is labeled "NAS DL DATA"). After some time, the S1 connection and the RRC connection are released. There are different proposals for how to handle the user plane transmissions above the MME, for example, introducing a special packet delivery mechanism between the MME and the SGW, but this is not essential to elaborate in the context of the example embodiments.

Figure 3:
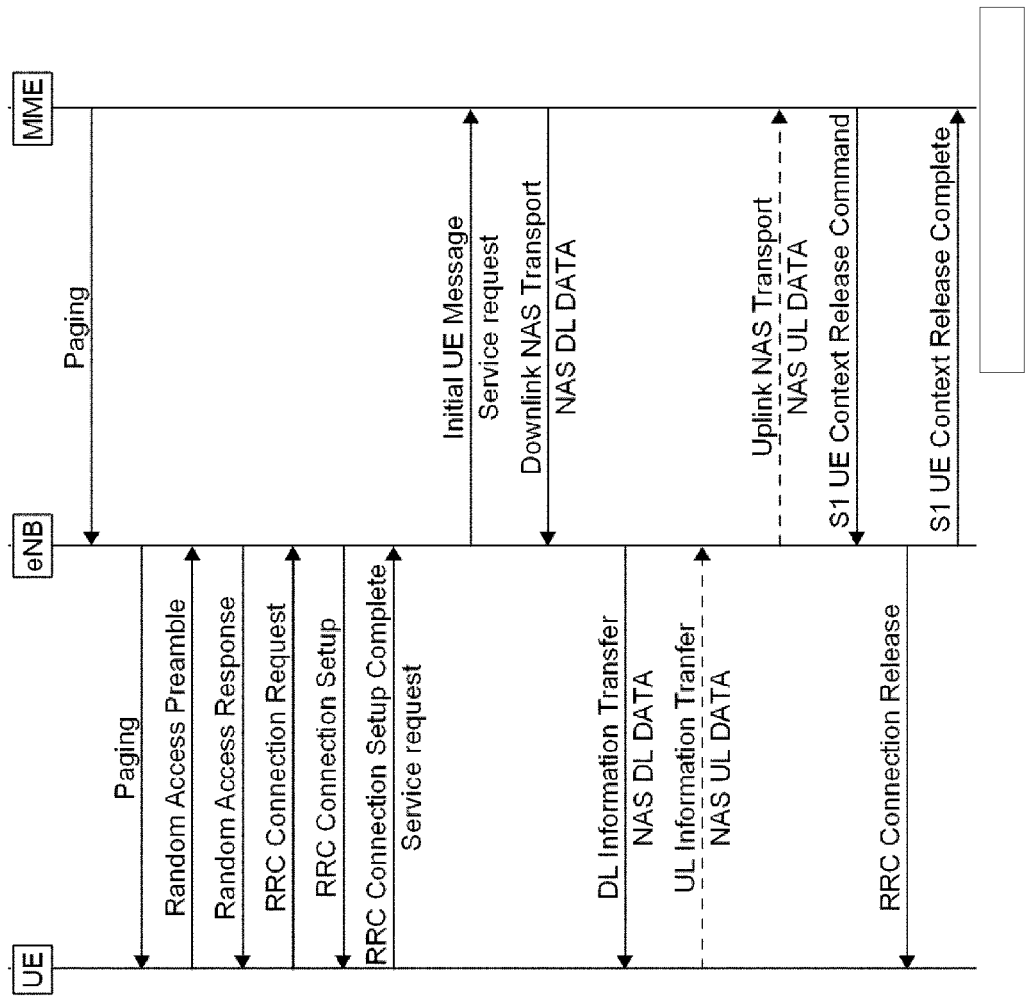
FIG. 3 is a messaging diagram depicting data over NAS downlink transmission in LTE.

In the case of a downlink packet, if the S1 and RRC connections are not established for the wireless terminal, the MME first needs to perform paging which triggers the wireless terminal to send a Service Request NAS message (or another newly defined NAS message with a similar function). This is shown in FIG. 3. Possibly some further uplink and/or downlink data over NAS transmissions may occur before the MME, after a certain (rather short) time, releases the S1 and RRC connections.

The long connected mode DRX concept has less impact on present standards and systems than data over NAS. However, long connected mode DRX is suitable only for stationary or low mobility wireless terminals. Otherwise, the frequent potential handover requires frequent neighbor cell measurements and potentially frequent measurement reporting. This may eliminate the benefits of the long connected mode DRX concept, both in terms desired energy savings and control plane overhead reduction. Alternatively, if infrequent neighbor cell measurements are used, the wireless terminal will frequently experience radio link failure (RLF) in conjunction with cell changes, because the handover procedure is triggered too late or not at all. Frequent radio link failures will also result in poor performance and increased control overhead and wireless terminal energy consumption.

Hence, it is beneficial to use the long connected mode DRX concept only for stationary or low mobility wireless terminals (provided that they also fulfill the criterion of communicating infrequently, for example, only small amounts of infrequent data), while regular connected mode without DRX or with non-extended DRX is used for other wireless terminals. If the data over NAS approach is implemented, the choice of connection mode for wireless terminals communicating only infrequent small amounts of data may instead be between long connected mode DRX and data over NAS.

As indicated above, it is crucial to choose the most appropriate connection mode for a wireless terminal in order to achieve the intended benefits while avoiding using suboptimal mechanisms. These choices would typically be based on configured parameters, such as subscription data or wireless terminal categories/capabilities.

However, for several reasons mode selection based on preconfigured parameters may sometimes result in suboptimal choices. Reasons may comprise the impact of the environment. Cell borders are not entirely static, but may vary with conditions such as traffic load, interference, movement of (mainly large) objects, for example, trucks. Weather conditions, for example, snow, rain or low humidity, season, for example, amount of leaves on the trees, etc., may also impact the environment. The wireless terminal may thus be deployed/installed in a location where the best cell changes more or less frequently even if the wireless terminal itself is stationary.

Further reasons may comprise impact of radio network deployment (e.g., cell topology). For instance, a wireless terminal that is used in an area with large cells may encounter very infrequent cell changes, whereas the same wireless terminal, if used in an area with many small cells, for example, in a heterogeneous network deployment scenario, may encounter much more frequent cell changes.

Another reason mode selection results in a suboptimal choice is the impact of wireless terminal deployment. The wireless terminal may for instance be deployed in a manner that results in higher mobility than expected, for example, in a vehicle that travels faster than expected or in a machine that is moved much more often than expected (e.g., used by technical service personnel constantly moving between different sites to perform reparations and maintenance tasks).

Yet another reason is misuse. Specifically, malicious perpetrators may deliberately cause problems through erroneous or manipulated configuration. A further reason may be poor parameter configuration. This may result from, for example, a misunderstanding of parameter semantics or poor assessment of the deployment and usage scenarios for the wireless terminal. Poor parameter configuration may also result from a generalization of parameter configuration, for example, all wireless terminals of a certain type are given the same parameter configuration, although some of them will be deployed and used in a manner that does not match this parameter configuration (and would thus require more individualized configuration. Poor parameter configuration may also results from pure mistakes, for example, human errors caused by stress, distraction, typos, etc.

Irrespective of its cause, inappropriate connection mode choices result in lost benefits and suboptimal performance, comprising poor system resource efficiency and increased energy consumption in the (possibly energy deprived) wireless terminal. The problems described above imply that there is a need for a "fall-back mechanism" which detects and corrects inappropriate connection mode choices and thus overrides the configuration based connection mode selection mechanism when needed. Such a mechanism may also be used for establishing a suitable connection mode default choice or tuning the connected mode DRX cycle length for a certain wireless terminal.

Overview of the Example Embodiments

The example embodiments presented herein achieve the desired "fall-back mechanism" through the collection of wireless terminal cell change statistics, which is used to derive a measure of the cell change frequency, which in turn is used to determine the most appropriate connection mode (and/or connected mode DRX cycle length) for the wireless terminal. The cell change statistics may be collected by the wireless terminal and reported to the network, where it may be accumulated, stored and processed.

The example embodiments will be further described according to the appropriate sub-heading. First, example means of how the cell change statistics are obtained will be described under the sub-heading 'Collection and storage of unreported cell change statistics'. Thereafter, example of how such statistics may be distributed throughout the network is provided under the subheading 'Reporting of cell change statistics'. The storage and the use of the cell change statistics are further discussed under the sub-headings 'Storage of reported cell change statistics in the network' and 'Usage of cell change statistics', respectively. Finally, example node configurations and example operations which may be utilized by nodes employing some of the example embodiments is provided under the sub-headings 'Example node configurations' and 'Example node operations', respectively.

Collection and Storage of Unreported Cell Change Statistics

According to some of the example embodiments, the cell change statistics are gathered by the wireless terminal. These statistics may comprise radio link failures (comprising handover failures), successful handovers or both. It should be appreciated that the notation "RLF/HO" will be used for "radio link failure and/or handover". Note that of interest in this context are only radio link failures that occur in conjunction with cell changes, for example, not radio link failures that occur because of loss of coverage or other failures within a single cell. Hence, when radio link failures henceforth are mentioned in this document, for example, when the term RLF/HO is used, this refers to radio link failures that occur in conjunction with cell changes, unless otherwise stated. Radio link failures without cell changes are thus not considered in the statistics.

To this end the wireless terminal keeps track of such events and stores relevant data to be reported to the network. The data may be stored on the UICC, for example, in the USIM, or in the Mobile Equipment (i.e., the non-UICC part of the UE).

RLF reporting from the wireless terminal to the network (eNB) exists already in current specifications. However, this comprises reporting of a single (the last) RLF event, which may be reported in the rlf-Report-r9 IE in the UEInformationResponse RRC message in response to a UEInformationRequest RRC message from the eNB. The wireless terminal also has the possibility to indicate availability of RLF data by comprising the rlf-InfoAvailable IE set to 'True' in the RRCConnectionSetupComplete RRC message or the RRCConnectionReconfiguration RRC message. Before the RLF data is reported to the network to the network it is temporarily stored in the UE variable VarRLF-Report. The data in the VarRLF-Report wireless terminal variable is discarded when it has been reported or, even if it has not been reported, after 48 hours (i.e. 48 hours after its data was created/stored) or when the wireless terminal is powered off or detached from the network. Furthermore, the RLF report comprises a rather large amount of data, which may be used to facilitate tuning of the radio network, for example, in terms of radio coverage, handover thresholds, eNB power and antenna tilts. Hence, this RLF reporting is not appropriate for the purpose intended in this solution.

However, optionally the existing RLF reporting may still be utilized as a basis for a more suitable RLF/HO event reporting. With this option the wireless terminal may store RLF/HO event data in a modified version of the wireless terminal variable VarRLF-Report. The stored data should not be discarded without being reported. Consequently it should survive a wireless terminal power off and network detach. Hence, it has to be stored on a non-volatile memory.

It should be appreciated that, according to some of the example embodiments, entirely new mechanisms for RLF/HO event data storage and reporting (i.e., not based on the above described existing mechanisms) may be introduced. The RLF/HO event data would then be stored separately from the VarRLF-Report UE variable.

The RLF/HO event data may comprise an indication of each event, for example, comprising the identity of the cell(s) where the event occurred. The event data may be associated with a timestamp to facilitate calculation of RLF/HO event frequency or cell switch frequency. Further data, for example, radio channel quality measurement related data, may also be comprised, but that is likely to be excessive information for most embodiments or applications of the invention, but may still potentially be useful for extensions of such applications or completely new applications and usages of the collected data.

A simpler and more streamlined alternative is that the RLF/HO event data comprises only a counter, which indicates the number of RLF/HO events since the last report was sent to the network or, possibly, since the wireless terminal attached to the network or since the network explicitly requested reset of the counter. Separate counters for RLF events and HO events would also be possible. The counter(s) may have an associated time period indication which indicates the time period during which the events indicated by the counter(s) occurred. It should also be appreciated that the counter(s) may be evaluated with respect to a threshold that may be predetermined and/or programmable.

The wireless terminal may associate a PLMN ID with the RLF/HO event data (and in case an RLF/HO event counter is used, the wireless terminal may maintain one counter per encountered PLMN ID). If the wireless terminal stores the RLF/HO event data in a modified version of the VarRLF-Report UE variable, the data for each event may also comprise equally extensive data as is stored in the current VarRLF-Report UE variable, possibly with an upper limit on the number of events. There could also be a maximum number of "fully" reported RLF events complemented by a counter indicating further (not fully reported) RLF events.

It should further be appreciated that RLF/HO events may be complemented by cell change events in idle mode in order to make the cell change statistics more comprehensive. A wireless terminal would detect idle mode cell changes through the regular cell re-selection behavior.

Reporting of Cell Change Statistics

The current reporting behavior, as described above, may either be reused or replaced by new procedures and rules. New reporting mechanisms, which are adapted to the example embodiments presented herein, may also be utilized. The wireless terminal could report the RLF/HO event data to either the eNB, in an RRC or MAC message, or to the MME in a NAS message.

If the wireless terminal reports the data to the eNB, the data could be conveyed in the UEInformationResponse RRC message or in a new RRC message. The RRCConnectionSetupComplete RRC message or the RRCConnectionReconfigurationComplete RRC message is also a possible option. An alternative to using RRC messaging could be to introduce a new MAC Control Element to be used to report the RLF/HO event data to the eNB in a MAC message.

If the wireless terminal reports the RLF/HO event data to the MME, there are several existing NAS messages that could be extended with a new IE for this purpose, for example, the Attach Request NAS message, the Service Request NAS message, the Extended Service Request NAS message or the Tracking Area Update Request NAS message. A new NAS message (or request-response message pair) may also be introduced for this purpose.

If RLF/HO event data is recorded per PLMN and consequently has an associated PLMN ID, then either the associated PLMN ID should be reported together with each set of RLF/HO event data or the wireless terminal should only report RLF/HO event data that pertains to the current PLMN, for example, which is associated with the PLMN ID of the PLMN receiving the report.

The reporting behavior may be designed in various ways. A simple way is to specify in standards when the wireless terminal should send an RLF/HO event report to the network. This may, for example, be that the wireless terminal should report RLF/HO events every time it attaches to the network and at every idle to connected mode transition, for example, using the RRCConnectionSetupComplete RRC message. Alternatively, or in addition, the wireless terminal may report RLF/HO event data upon request from the network.

According to some of the example embodiments, the network may configure reporting criteria in the wireless terminal. The eNB or the MME may configure the wireless terminal, for example, to report RLF/HO event data when a certain number of RLF/HO events have occurred or if a certain number of RLF/HO events occur during a certain time interval (i.e., essentially an RLF/HO event frequency threshold) or when a sliding/moving (e.g., exponential) average of the RLF/HO event frequency exceeds a certain threshold. Other possible reporting criteria comprises periodic reporting, reporting after each $N^{th}$ RLF/HO event, reporting when the number of RLF/HO events in relation to transmitted data (e.g., expressed as a sliding/moving average) exceeds a certain threshold or reporting when a combination of criteria are met. When the reporting criteria are fulfilled, the wireless terminal may either report immediately or opportunistically await the next signaling transaction that provides an opportunity to provide the RLF/HO event report.

Storage of Reported Cell Change Statistics in the Network

The reported RLF/HO event data may be stored in the network and accumulated to statistics that is appropriate as a basis for selection of a connection mode for the concerned wireless terminal. Thus, it may be stored in a manner which makes it survive periods when the wireless terminal is detached from the network. The IMSI of the reporting wireless terminal may be associated with the stored data.

To this end, the MME may be responsible for storing and retrieving data from the storage. If the user equipment reports the data to the eNB, the eNB should forward it to the MME. This could be done using a new IE in any S1AP message sent from the eNB to the MME, for example, the INITIAL UE MESSAGE S1AP message, the INITIAL CONTEXT SETUP RESPONSE S1AP message or the UE CONTEXT RELEASE COMPLETE S1AP message. A new S1AP message may also be introduced.

The data may be stored in a database in the network. This database may be the HSS, the HLR, the SPR or some other database, for example, an EIR, a database in the O&M system or a database that is accessible from or mirrored among all the MMEs in the network. If the RLF/HO event data is stored in the HSS, or the HLR the data may, for example, be transferred from the MME to the HSS in a Cancel Location Ack message. When a wireless terminal registers in a new MME, for example, through the Attach or Tracking Area Update procedure, the relevant RLF/HO event statistics may be transferred from the HSS, or the HLR, to the MME in an Update Location Ack message.

When storing new data in the database it should be integrated with the already accumulated data or, in some cases, replace the previously stored data. The integration with the already accumulated data may for instance be in the form of a simple addition or as an update of a sliding/moving (e.g., exponential) average.

It should further be appreciated that cell change statistics may be stored with respect to a particular wireless terminal or device. A wireless terminal in principle comprises two main parts: (1) the UICC (hosting the USIM), which in essence represents the subscriber/user (and is associated with the subscription), and (2) the Mobile Equipment (ME) which comprises all non-UICC parts. Being a "representative" of the subscriber the UICC/USIM is identified by the IMSI. The ME may be identified by the IMEI.

This division allows a user to use different terminal devices (MEs) with the same subscription, for example, by moving the UICC between different terminal devices. The mobility behavior may depend both on the user and the currently used terminal device. Hence, it may be useful to distinguish cell change statistics associated with different combinations of user and terminal device, identified by IMSI and IMEI. To this end cell change statistics may be associated with an IMSI, an IMEI or a combination of IMSI and IMEI.

Note, however, that as the example embodiments are described primarily with the use of MTC devices in mind, the concept of a "user" is somewhat inappropriate and consequently the notion of a distinction between user and terminal device may not be applicable in practice. Still, the feature discussed above may be considered for completeness and for non-mainstream scenarios such as personal MTC devices tied to the subscription of a regular user/subscriber.

Usage of Cell Change Statistics

The collected cell change (RLF/HO event) statistics is used to detect inappropriate connection mode choices or inappropriate default connection mode configurations for wireless terminals that are potential users of long connected mode DRX. It may also be used to learn enough about a wireless terminal's behavior to determine an appropriate default connection mode configuration for the wireless terminal or to tune the (long) DRX settings. It may thus be used short term to detect and change an inappropriate connection mode and in the long term to determine or tune a default connection mode configuration.

Potential short term usage may comprise detection of an inappropriate connection mode. Short term usage may also comprise switching from a long connected mode DRX to non-DRX connection mode, or to a data over NAS connection mode, or vice versa after detection of inappropriate connection mode. Short term usage may further comprise short term adaptation (e.g., tuning) of the length of the connected mode DRX cycle along the entire scale from the regular DRX cycle lengths to the long extended connected mode DRX cycle lengths.

Potential long term usage may comprise learning which connection mode, for example, long connected mode DRX, a non-DRX connection mode or a data over NAS connection mode, to employ for the wireless terminal. Potential long term usage may further comprise long term adaptation (e.g., tuning) of the length of the connected mode DRX cycle along the entire scale from the regular DRX cycle lengths to the long extended connected mode DRX cycle lengths. Potential long term usage may also comprise creating a blacklist of wireless terminals for which long connected mode DRX is inappropriate.

Algorithms used for connection mode choice or DRX cycle length tuning may be based on the frequency of cell changes. A suitable principle may be to let the algorithm produce a sliding/moving (e.g., exponential) average of the cell change frequency or, perhaps more straightforward, the average of the time interval between cell changes. The lower the cell change frequency (or the longer the cell change interval), the greater the preference towards long connected mode DRX or the longer the connected mode DRX cycle and vice versa.

Since the accumulated cell change statistics for a wireless terminal is available in the wireless terminal's current MME, a straightforward choice may be to let the MME be responsible for execution of the above mentioned algorithm and decisions of potential actions. If the MME determines that the connection mode or connected mode DRX cycle length may be changed for a wireless terminal, the MME informs the wireless terminal's current eNB through an S1AP message, for example, a UE CONTEXT MODIFICATION REQUEST S1AP message. The default connection mode choice and/or connected mode DRX cycle length may be signaled to the eNB in the INITIAL CONTEXT SETUP REQUEST S1AP message, for example, when the wireless terminal connects to the eNB.

During an X2 handover, the current and/or default connection mode and/or current and default connected mode DRX cycle length may be transferred from the source to the target eNB using a message of the X2AP protocol over the X2 interface. During a S1 handover, this data may instead be transferred from the source to the target eNB using the Source to Target Transparent Container IE. Alternatively, it may be conveyed from the MME in the HANDOVER REQUEST S1AP message. For both X2 and S1 handovers another possible alternative is that the information is conveyed from the MME in the PATH SWITCH ACKNOWLEDGE S1AP message.

An alternative to letting the MME be responsible for executing the algorithm for short term decisions, for example, potential switches between connection mode and/or tuning of the currently used connected mode DRX cycle could be to let the eNB have this responsibility. This assumes that the wireless terminal reports the RLF/HO event data to the eNB. During inter-eNB handovers accumulated statistics (per attach session and/or inter-attach session) may be transferred from the source to the target eNB using the means indicated above.

According to some of the example embodiments, locally valid cell change statistics may be utilized in the management of a connection mode of the wireless terminal. Wireless terminal cell change statistics may be refined by making it locally valid, for example, by associating it to different areas. This may be motivated by potentially different cell change frequency in different areas. Differences in cell change frequency may be caused by differences in the cell deployment, for example, the cell sizes or presence of hierarchical cell layers such as macro and pico layers. Differences in cell change frequency may also be caused by aspects independent of the cellular network, for example, environmental differences which impact the wireless terminal's mobility behavior, such as non-urban, urban or indoor environments, or the presence of transportation infrastructure in the area, for example, highways or railroad tracks.

To this end, cell change statistics may be collected, accumulated, stored and used on the basis of (i.e., associated with) cell, eNB (i.e., the cells of an eNB), Tracking Area, MME pool coverage area or some otherwise defined area, such as a list of cells, a list of Tracking Areas or a geographically defined area.

This feature would enable different connection mode choices and/or connected mode DRX cycle lengths in different areas. The choice of connection mode and/or connected mode DRX cycle length may be made in the cell/area where the wireless terminal enters connected mode and then kept while the wireless terminal moves. Alternatively, the connection mode and/or connected mode DRX cycle length may be changed every time the wireless terminal moves into another area (e.g., provided that the cell changes statistics associated with the new area motivates the change).

According to some of the example embodiments, a cell size may be utilized in the connection mode management of a wireless terminal. Since the cell change frequency may depend on the cell size (smaller cells may imply more frequent cell changes and vice versa), adapting connection mode choices and/or connected mode DRX cycle settings based on the size of the current cell (or the average cell size in the area) may be appropriate. For instance, large cell sizes would imply greater preference for long connected mode DRX (as connection mode choice) and/or longer connected mode DRX cycle lengths (in conjunction with connected mode DRX cycle length tuning) than small cell sizes.

To this end the algorithm(s) used for connection mode choice and/or connected mode DRX cycle length tuning may comprise a cell size dependent part, for example, a scaling factor or the like. Instead of integrating the cell size dependency in the algorithm, the cell size dependency may be accounted for by the eNB, which could adapt connection mode choices and/or connected mode DRX cycle lengths received from the MME. This would make the impact of the cell size a separate step or, with an alternative view, it would make the algorithm execution "distributed".

Example Node Configurations

Figure 4:
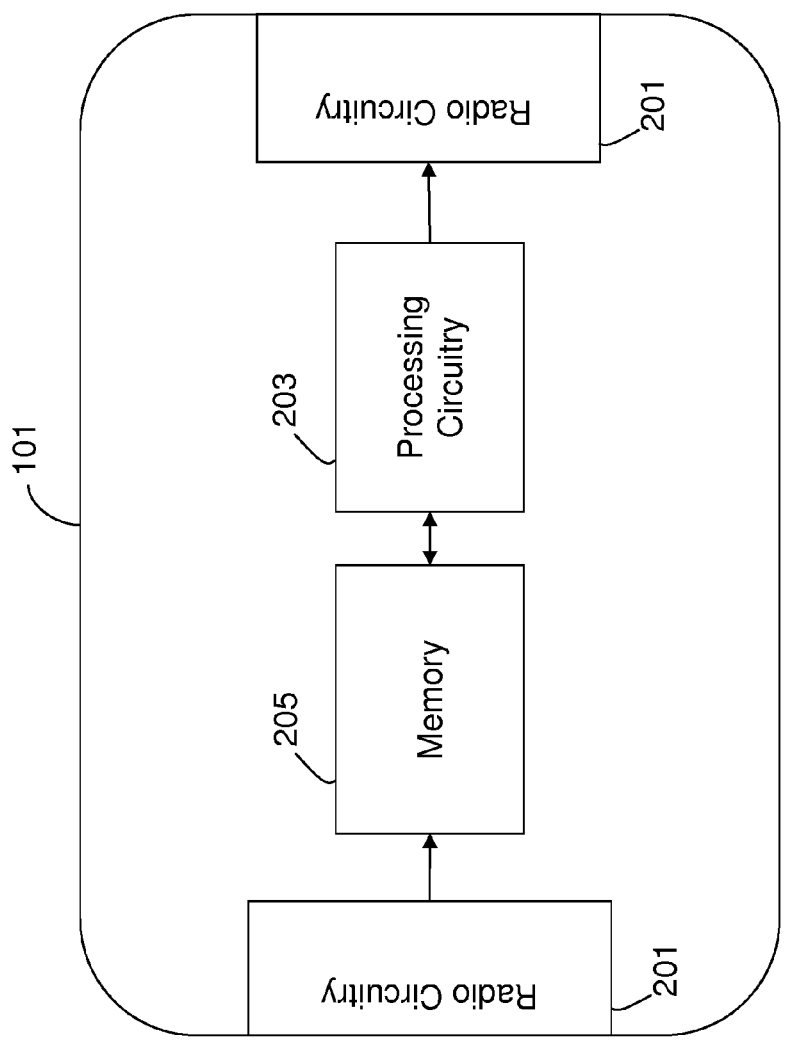
FIG. 4 is an example node configuration of a wireless terminal, according to some of the example embodiments.

FIG. 4 illustrates an example node configuration of a wireless terminal 101 which may perform some of the example embodiments described herein. The wireless terminal 101 may comprise radio circuitry or a communication port 201 that may be configured to receive and/or transmit communication data, instructions, and/or messages. It should be appreciated that the radio circuitry or communication port 201 may be comprised as any number of transceiver, receiver, and/or transmitter units or circuitry. It should further be appreciated that the radio circuitry or communication 201 may be in the form of any input or output communications port known in the art. The radio circuitry or communication 201 may comprise RF circuitry and baseband processing circuitry (not shown).

The wireless terminal 101 may also comprise a processing unit or circuitry 203 which may be configured to provide handling for the connectivity management of a user equipment or wireless terminal. The processing circuitry 203 may be any suitable type of computation unit, for example, a microprocessor, digital signal processor (DSP), field programmable gate array (FPGA), or application specific integrated circuit (ASIC), or any other form of circuitry. The wireless terminal 101 may further comprise a memory unit or circuitry 205 which may be any suitable type of computer readable memory and may be of volatile and/or non-volatile type. The memory 205 may be configured to store received, transmitted, and/or measured data, device parameters, communication priorities, and/or executable program instructions.

Figure 5:
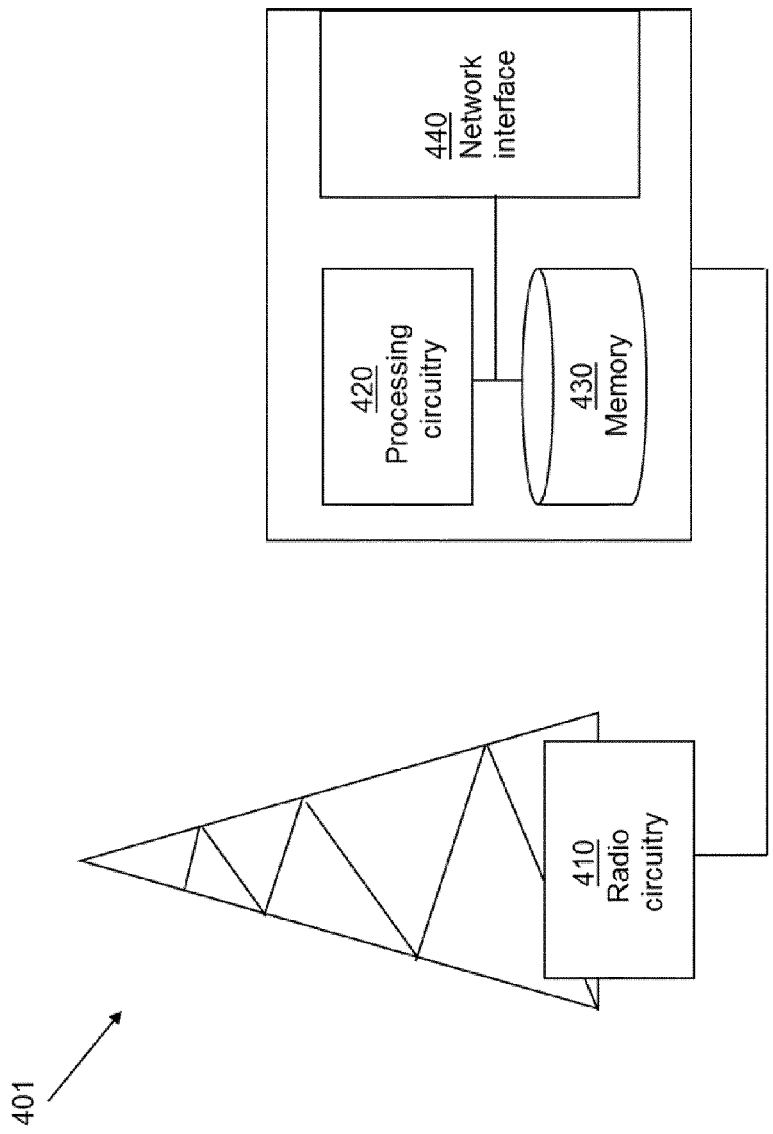
FIG. 5 is an example node configuration of a base station, according to some of the example embodiments.

FIG. 5 illustrates an example node configuration of a base station 401 which may perform some of the example embodiments described herein. The base station 401 may comprise radio circuitry or a communication port 410 that may be configured to receive and/or transmit communication data, instructions, and/or messages. It should be appreciated that the radio circuitry or communication port 410 may be comprised as any number of transceiver, receiver, and/or transmitter units or circuitry. It should further be appreciated that the radio circuitry or communication 410 may be in the form of any input or output communications port known in the art. The radio circuitry or communication 410 may comprise RF circuitry and baseband processing circuitry (not shown).

The base station 401 may also comprise a processing unit or circuitry 420 which may be configured to provide connectivity management for a user equipment or wireless device. The processing circuitry 420 may be any suitable type of computation unit, for example, a microprocessor, digital signal processor (DSP), field programmable gate array (FPGA), or application specific integrated circuit (ASIC), or any other form of circuitry. The base station 401 may further comprise a memory unit or circuitry 430 which may be any suitable type of computer readable memory and may be of volatile and/or non-volatile type. The memory 430 may be configured to store received, transmitted, and/or measured data, device parameters, communication priorities, and/or executable program instructions.

Figure 6:
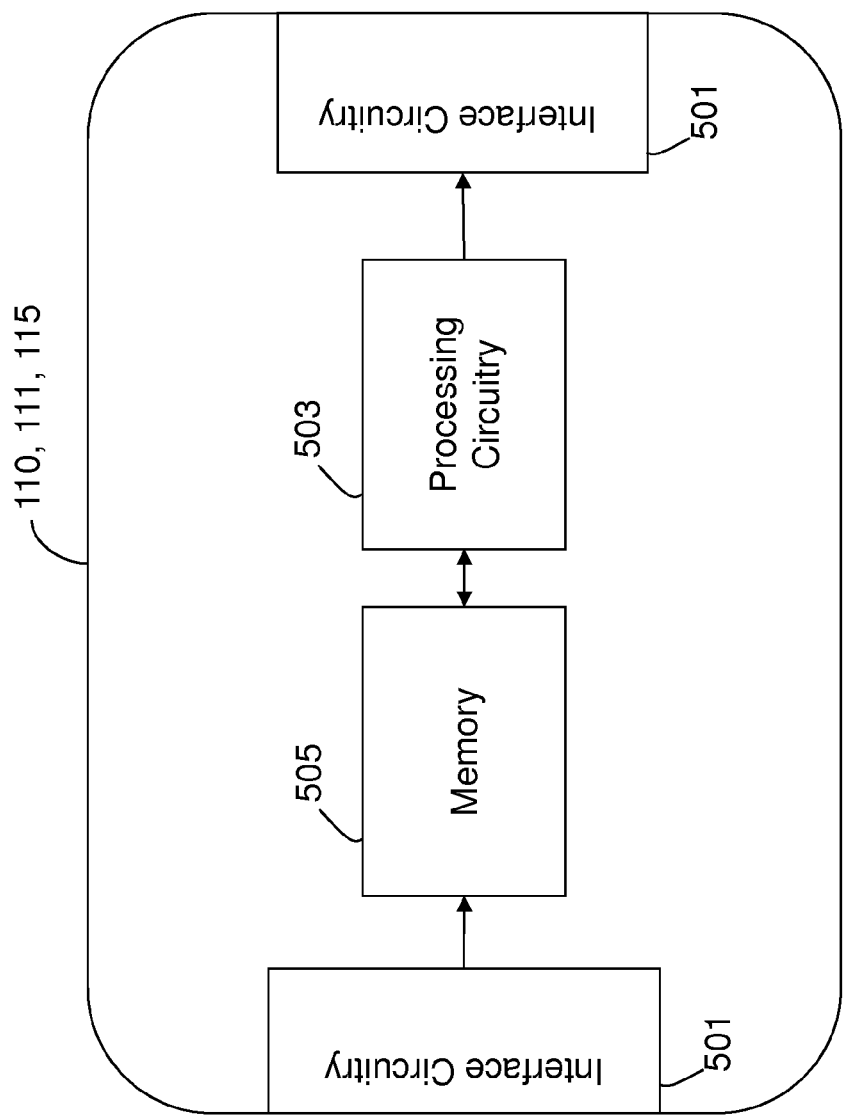
FIG. 6 is an example node configuration of a mobility management node (e.g., a S4-SGSN, SGSN or a MME), according to some of the example embodiments.

FIG. 6 illustrates an example node configuration of a mobility management node, for example, a S4-SGSN 110, a SGSN 111 or a MME 115, which may perform some of the example embodiments described herein. The mobility management node 110/111/115 may comprise radio/microwave/interface circuitry or a communication port 501 that may be configured to receive and/or transmit communication data, instructions, and/or messages. It should be appreciated that the radio/microwave/interface circuitry or communication port 501 may be comprised as any number of transceiver, receiver, and/or transmitter units or circuitry. It should further be appreciated that the radio/microwave circuitry or communication 501 may be in the form of any input or output communications port known in the art. The radio/microwave/interface circuitry or communication 501 may comprise RF circuitry and baseband processing circuitry (not shown).

The mobility management node 110/111/115 may also comprise a processing unit or circuitry 503 which may be configured to provide handling for connectivity management of a user equipment or wireless device. The processing circuitry 503 may be any suitable type of computation unit, for example, a microprocessor, digital signal processor (DSP), field programmable gate array (FPGA), or application specific integrated circuit (ASIC), or any other form of circuitry. The mobility management node 110/111/115 may further comprise a memory unit or circuitry 505 which may be any suitable type of computer readable memory and may be of volatile and/or non-volatile type. The memory 505 may be configured to store received, transmitted, and/or measured data, device parameters, communication priorities, and/or executable program instructions.

Example Node Operations

Figure 7:
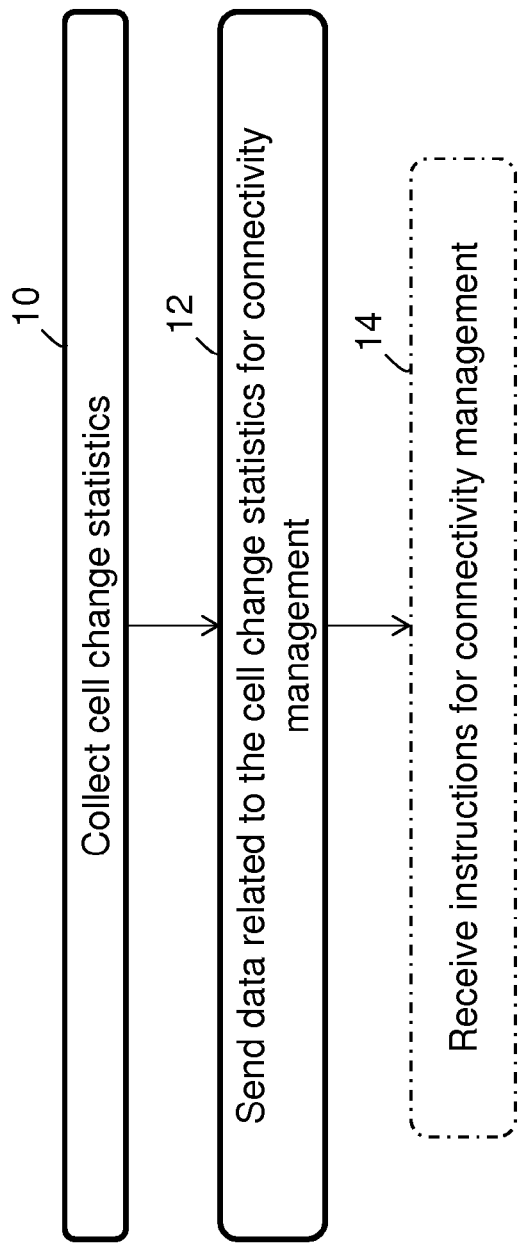
FIG. 7 is a flow diagram depicting example operations of the wireless terminal of FIG. 4, according to some of the example embodiments.

FIG. 7 is a flow diagram depicting example operations which may be taken by the user equipment 101 or wireless terminal of FIG. 4 for providing handling for connectivity management. It should also be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations will be explained using the example network elements provided in FIGS. 1-6. The example operations involve a network node. It should be appreciated that a network node may be a base station 401, a S4-SGSN 110, a SGSN 111 or a MME 115. It should be appreciated that the wireless terminal may be a user equipment or a MTC device.

Operation 10

The wireless terminal or user equipment 101 is configured to collect 10 cell change statistics. The processing circuitry 203 is configured to collect the cell change statistics. According to some of the example embodiments, the cell change statistics may comprise radio link failure, handover and/or idle mode cell change statistics.

According to some of the example embodiments, the collecting is performed according to a predetermined time schedule. It should also be appreciated that the collecting may be performed with respect to a counter. For example, when the counter exceeds a threshold with respect to a number of mobility procedures (e.g., handover) and/or measurements taken by the wireless terminal, collection may commence. Thus, the wireless terminal may be configured to collect statistics during any time schedule (which may be periodic) or number of events as determined, for example, by an operator and/or subscription. It should further be appreciated that the collection of cell change statistics may occur while the wireless device is in an idle mode.

It should be appreciated that in some scenarios it may even be useful to omit some collection until the wireless terminal knows that the cell change frequency is high enough to be of potential interest to the network, for example, in scenarios where only high cell change frequency is of interest. In order to keep track of the counter, the wireless terminal may need to perform a minimum level of collection, for example, the counter value itself. But the counter may later trigger more comprehensive data collection. Operation 10 is further explained under at least the sub-heading 'Collection and storage of unreported cell change statistics'.

Operation 12

The wireless terminal is also configured to send 12, to a network node 401/110/111/115, data related to the cell change statistics for connectivity management of the wireless terminal. The radio circuitry 201 is configured to send, to the network node 401/110/111/115, the data related to the cell change statistics for connectivity management of the wireless terminal.

According to some of the example embodiments, the sending is performed according to a predetermined time schedule. It should also be appreciated that the sending may be performed with respect to a counter. For example, when the counter exceeds a threshold with respect to a number of mobility procedures (e.g., handover) and/or measurements taken by the wireless terminal, sending may commence. Thus, the wireless terminal may be configured to collect statistics and send the statistics according to any time schedule (which may be periodic) or number of events as determined, for example, by an operator and/or subscription.

According to some of the example embodiments, the network node is a base station 401 and the data related to the cell change statistics is comprised in a RRC or MAC based message. According to some of the example embodiments, the network node is a S4-SGSN 110, a SGSN 111, or a MME 115 and the data related to the cell change statistics is comprised in a NAS based message. Operation 12 is further explained under at least the sub-heading 'Reporting of cell change statistics'.

Example Operation 14

According to some of the example embodiments, the wireless terminal or user equipment 101 may further be configured to receive 14, from the network node 401/110/111/115, instructions for connectivity management. The instructions inform the wireless terminal to enter into a DRX connection mode or another connection mode, such as a non-DRX connection mode or a data over NAS connection mode. The instructions may also inform the wireless terminal to adjust a DRX cycle length. The radio circuitry 201 is configured to receive, from the network node 401/110/111/115, the instructions for connectivity management. Example operation 14 is further described under at least the sub-heading 'Usage of cell change statistics'.

Figure 8:
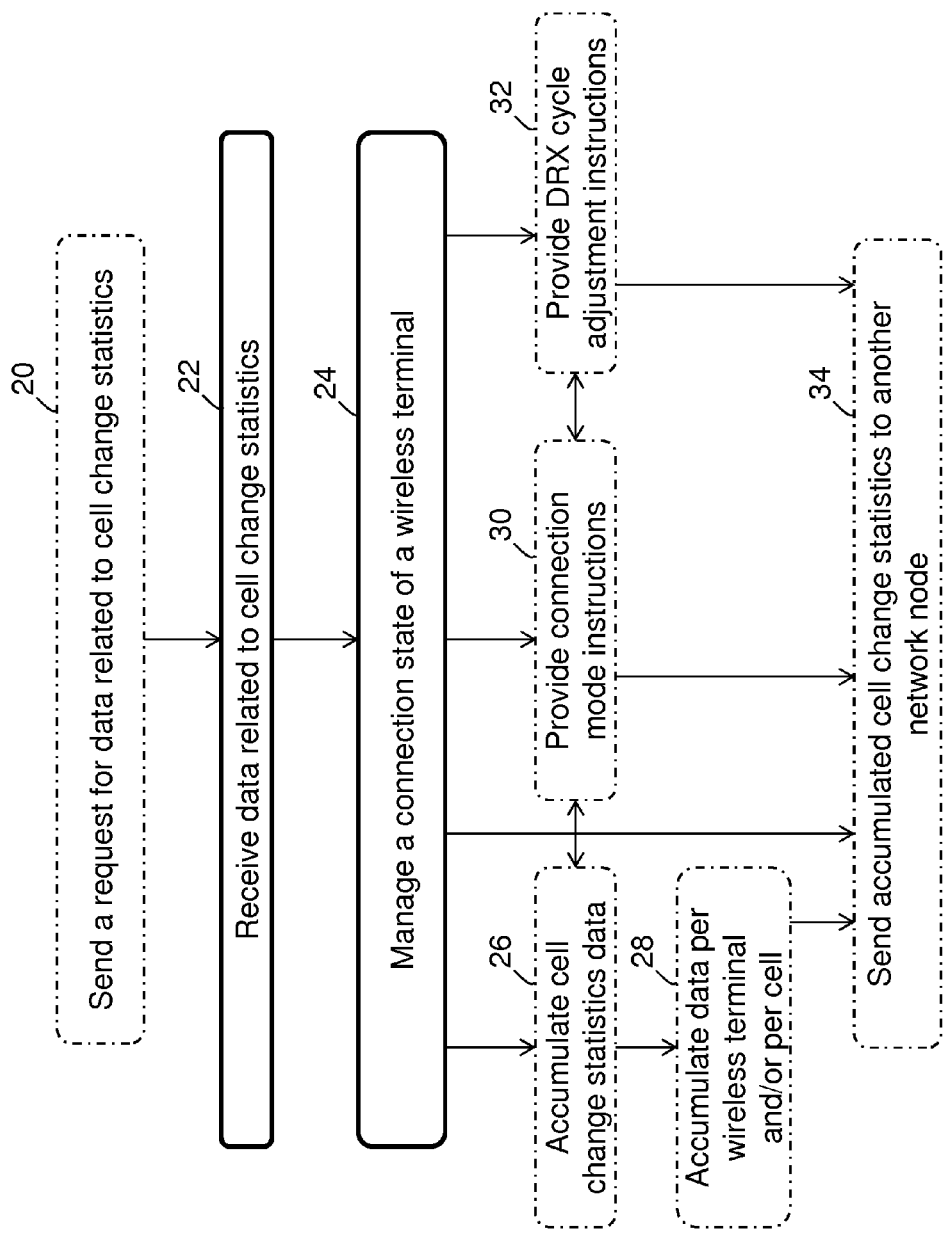
FIG. 8 is a flow diagram depicting example operations of a network node (e.g., a base station, S4-SGSN, SGSN or MME) of FIGS. 5 and 6, according to some of the example embodiments.

FIG. 8 is a flow diagram depicting example operations which may be taken by the network node 401/110/111/115 of FIGS. 5 and 6 for providing connectivity management. It should also be appreciated that FIG. 8 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations will be explained using the example network elements provided in FIGS. 1-6. It should be appreciated that a network node may be a base station 401, a S4-SGSN 110, a SGSN 111 or a MME 115. It should also be appreciated that the wireless terminal may be a user equipment or a MTC device.

Example Operation 20

According to some of the example embodiments, the network node 401/110/111/115 may be configured to send 20, to the wireless terminal 101, a request for data related to cell change statistics. The radio or interface circuitry 410/501 is configured to send, to the wireless terminal 101, the request for data related to cell change statistics. According to some of the example embodiments, the sending of the request may be performed according to a predetermined time schedule. Thus, the network node 401/110/111/115 may be configured to request statistics according to any time schedule (which may be periodic) or number of events as determined, for example, by an operator and/or subscription. Example operation 20 is further described under at least the sub-heading 'Reporting of cell change statistics'.

Operation 22

The network node 401/110/111/115 is further configured to receive 22 data related to cell change statistics collected by the wireless terminal 101 over a predetermined period of time or as a result of a predetermined condition such as a cell change frequency exceeding a certain threshold or a counter value exceeding a certain threshold. The radio or interface circuitry 410/501 is configured to receive data related to the cell change statistics collected by the wireless terminal 101 over a predetermined period of time or as a result of a predetermined condition such as a cell change frequency exceeding a certain threshold or a counter value exceeding a certain threshold. Operation 22 is further described under at least the sub-heading 'Reporting of cell change statistics'.

Operation 24

The network node 401/110/111/115 is also configured to manage a connection state of the wireless terminal 101 based, at least in part, on the data related to cell change statistics. The processing circuitry 420/503 is configured to manage the connection state of the wireless terminal 101 based, at least in part, on the data related to cell change statistics. Operation 24 is further described under at least the sub-headings 'Storage of reported cell change statistics in the network' and 'Usage of cell change statistics'.

Example Operation 26

According to some of the example embodiments, the managing 24 may further comprise accumulating 26 cell change statistics based on the received data from any number of wireless terminals 101 served by the network node 401/110/111/115. The processing circuitry 420/503 is configured to accumulate the cell change statistics based on the received data form any number of wireless terminals 101 served by the network node 401/110/111/115. Example operation 26 is further described under at least the sub-heading 'Storage of reported cell change statistics in the network'.

Example Operation 28

According to some of the example embodiments, the accumulating 26 may further comprise accumulating 28 the cell change statistics based on, at least in part, a wireless terminal 101 IMSI and/or IMEI, based on a cell or area where the wireless terminal is situated, and/or based on a size of the a cell the wireless terminal is situated in. The processing circuitry 420/503 may be configured to accumulate the cell change statistics as described above. Example operation 28 is further described under at least the sub-heading 'Storage of reported cell change statistics in the network'.

Example Operation 30

According to some of the example embodiments, the managing 24 may further comprise providing 30 connecting instructions to the wireless terminal 101 for entering a DRX connection mode or another connection mode such as a non-DRX connection mode or a data over NAS connection mode. The connection instructions may alternatively, or in addition, inform the wireless terminal to adjust a DRX cycle length. The connection instructions may be based on, at least in part, the data related to cell change statistics and/or accumulated cell change statistics. The processing circuitry 420/503 may be configured to provide connection instructions to the wireless terminal 101. Example operation 30 is further described under at least the sub-heading 'Usage of cell change statistics'.

Example Operation 32

According to some of the example embodiments, the managing 24 may further comprise providing 32 adjustment instructions to the wireless terminal 101. The adjustment instructions may provide information for the wireless terminal 101 for adjusting a DRX cycle. The adjustment instructions are based on, at least in part, the data related to the cell change statistics, accumulated cell change statistics and/or a current cell size of the wireless terminal 101. Example operation 32 is further described under at least the sub-heading 'Usage of cell change statistics'.

Example Operation 34

According to some of the example embodiments, the managing 24 may further comprise sending 34, to another network node, the accumulated cell change statistics. The radio/interface circuitry 410/501 or the network interface 440 may be configured to send, to the other network node, the accumulated cell change statistics. According to some of the example embodiments, the network node may be a source network node and the other network node may be a target network node. In such a scenario, the sending 34 may occur during a mobility procedure (e.g., handover). It should also be appreciated that the sending 34 may also occur via a Cancel Location Ack message.

CONCLUSION

The example embodiments are described in terms of EPS/LTE, but it should be noted that the general concepts of the solution are applicable also to UMTS/WCDMA/HSPA. It should be noted that although terminology from 3GPP LTE has been used herein to explain the example embodiments, this should not be seen as limiting the scope of the example embodiments to only the aforementioned system. Other wireless systems, comprising WCDMA, HSPA, CDMA2000, WiMAX, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a MTC device, a home entertainment system, a television, etc. It should be appreciated that the term user equipment may also comprise any number of connected devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a wireless terminal, for facilitating connectivity management, the wireless terminal being comprised in a communications network, the method comprising:

collecting cell change statistics; and sending, to a network node, data related to said cell change statistics for connectivity management of the wireless terminal; and receiving, from the network node, instructions for connectivity management, said instructions informing the wireless terminal to enter into a Discontinuous Reception, DRX, connection mode, a non-DRX connection mode or a data over Non-Access Stratum, NAS, connection mode, or said instructions informing the wireless terminal to adjust a DRX cycle length.

2. The method of claim 1, wherein the cell change statistics comprises radio link failure, handover or idle mode cell change statistics.

3. The method of claim 1, wherein the collecting is performed according to a predetermined time schedule or with respect to a counter, wherein the collecting is performed if said counter exceeds a threshold with respect to a number of mobility procedures or measurements taken by the wireless terminal.

4. The method of claim 1, wherein the sending is performed based on a request received from the network node, according to a predetermined time schedule or with respect to a counter, wherein the sending is performed if said counter exceeds a threshold with respect to a number of mobility procedures or measurements taken by the wireless terminal.

5. The method of claim 1, wherein the collecting is performed, at least in part, during an idle mode of the wireless terminal.

6. The method of claim 1, wherein the network node is a base station and the data related to said cell change statistics is comprised in a Radio Resource Control, RRC, or Medium Access Control, MAC, based message.

7. The method of claim 1, wherein the network node is a Mobility Management Entity, MME, a Serving General Packet Radio Service Support Node, SGSN, or a S4-SGSN, and the data related to said cell change statistics is comprised in a Non-Access Stratum, NAS, based message.

8. A wireless terminal, for facilitating connectivity management, the wireless terminal being comprised in a communications network, the wireless terminal comprising:
processing circuitry configured to collect cell change statistics; and
radio circuitry configured to:
send, to a network node, data related to said cell change statistics for connectivity management of the wireless terminal; and
receive, from the network node, instructions for connectivity management, said instructions informing the wireless terminal to enter into a Discontinuous Reception, DRX, connection mode, a non-DRX connection mode or a data over Non-Access Stratum, NAS, connection mode, or said instructions informing the wireless terminal to adjust a DRX cycle length.

9. The wireless terminal of claim 8, wherein the cell change statistics comprises radio link failure, handover or idle mode cell change statistics.

10. The wireless terminal of claim 8, wherein the processing circuitry is configured to collect cell change statistics over a predetermined time frame or with respect to a counter, said counter evaluating a number of mobility procedures or measurements taken by the wireless terminal with respect to a threshold.

11. The wireless terminal of claim 8, wherein the processing circuitry is further configured to collect cell change statistics, at least in part, during an idle mode of the wireless terminal.

12. The wireless terminal of claim 8, wherein the wireless terminal is a user equipment or a Machine Type Communication, MTC, device.

13. A method, in a network node, for connectivity management of a wireless terminal based on, at least in part, data related to cell change statistics, the method comprising:
receiving data related to cell change statistics collected by a wireless terminal over a predetermined period of time or as a result of a predetermined condition; and
managing a connection state of the wireless terminal based, at least in part, on the data related to cell change statistics;
wherein the managing further comprises providing connection instructions to the wireless terminal for entering a Discontinuous Reception, DRX, connection mode, a non-DRX connection mode or a data over Non-Access Stratum, NAS, connection mode, or said connection instructions informing the wireless terminal to adjust a DRX cycle length, said connection instructions being based on, at least in part, the data related to cell change statistics or accumulated cell change statistics.

14. The method of claim 13, further comprising sending, to the wireless terminal, a request for said data related to cell change statistics.

15. The method of claim 13, wherein the managing further comprises accumulating cell change statistics based on received data from any number of wireless terminals served by the network node.

16. The method of claim 15, further comprising accumulating said cell change statistics based on, at least in part, a wireless terminal International Mobile Subscriber Identity, IMSI, or International Mobile Equipment Identity, IMEI, based on a cell or area the wireless terminal is situated in, or based on a size of a cell the wireless terminal is situated in.

17. The method of claim 13, wherein the managing further comprises providing adjustment instructions to the wireless terminal for adjusting a Discontinuous Reception, DRX, cycle, wherein the adjustment instructions are based on, at least in part, the data related to cell change statistics, accumulated cell change statistics, or a current cell size of the wireless terminal.

18. A network node for connectivity management of a wireless terminal based on, at least in part, data related to cell change statistics, the network node comprising:
radio or interface circuitry configured to receive data related to cell change statistics collected by a wireless terminal over a predetermined period of time or as a result of a predetermined condition; and
processing circuitry configured to:
manage a connection state of the wireless terminal based on, at least in part, the data related to cell change statistics; and
provide connection instructions to the wireless terminal for entering a Discontinuous Reception, DRX, connection mode, a non-DRX connection mode or a data over Non-Access Stratum, NAS, connection mode, or said connection instructions informing the wireless terminal to adjust a DRX cycle length said connection instructions being based on, at least in part, the data related to cell change statistics or accumulated cell change statistics.

19. The network node of claim 18, wherein the processing circuitry is further configured to accumulate cell change statistics based on received data from any number of wireless terminals served by the network node.

20. The network node of claim 19, wherein the processing circuitry is further configured to accumulate said cell change statistics based on, at least in part, a wireless terminal International Mobile Subscriber Identity, IMSI, or International Mobile Equipment Identity, IMEI, based on a cell or area the wireless terminal is situated in, or based on a size of a cell the wireless terminal is situated in.

21. The network node of claim 18, wherein the processing circuitry is further configured to provide adjustment instructions to the wireless terminal for adjusting a Discontinuous Reception, DRX, cycle, wherein the adjustment instructions are based on, at least in part, the data related to cell change statistics, accumulated cell change statistics, or a current cell size of the wireless terminal.

* * * * *